(12) United States Patent
Dupuis

(10) Patent No.: US 6,932,102 B2
(45) Date of Patent: Aug. 23, 2005

(54) DEVICE FOR REGULATING THE FLOW RATE AND/OR THE PRESSURE OF A FLUID

(75) Inventor: Alain Dupuis, Cruseilles (FR)

(73) Assignee: Olicorp Sarl, Geneva (CH)

( * ) Notice: Subject to any disclaimer, the term of this patent is extended or adjusted under 35 U.S.C. 154(b) by 322 days.

(21) Appl. No.: 10/414,425

(22) Filed: Apr. 15, 2003

(65) Prior Publication Data

US 2003/0209266 A1 Nov. 13, 2003

(30) Foreign Application Priority Data

Apr. 19, 2002 (FR) .............................. 02 04960

(51) Int. Cl.[7] .................. G05D 27/02; G05D 11/13; B29C 49/78
(52) U.S. Cl. ..................... 137/115.04; 137/115.25; 137/116.3; 137/87.05; 251/118; 264/40.3; 425/162; 425/535
(58) Field of Search .............. 137/87.05, 115.04, 137/115.25, 116.3; 251/118; 264/40.3; 425/162, 535

(56) References Cited

U.S. PATENT DOCUMENTS

| | | | |
|---|---|---|---|
| 5,078,930 A | * 1/1992 | Herrington, Jr. | ........... 264/40.3 |
| 5,146,941 A | 9/1992 | Statler | |
| 5,518,021 A | 5/1996 | Loureiro Benimeli | |
| 5,816,285 A | 10/1998 | Ohmi et al. | |
| 5,817,348 A | * 10/1998 | Ikeda | .................. 425/529 |
| 5,902,527 A | * 5/1999 | Flood | .................. 264/40.3 |
| 6,284,171 B1 | 9/2001 | Nonomura et al. | |
| 6,709,611 B1 | * 3/2004 | Emmer et al. | .......... 264/37.16 |

FOREIGN PATENT DOCUMENTS

| | | |
|---|---|---|
| EP | 0 605 743 A | 7/1994 |
| EP | 0 824 232 A | 2/1998 |
| EP | 0 919 355 A | 6/1999 |

OTHER PUBLICATIONS

Preliminary Search Report in SN FR 0204960.

* cited by examiner

*Primary Examiner*—Ramesh Krishnamurthy
(74) *Attorney, Agent, or Firm*—Bugnion S.A.; John Moetteli

(57) ABSTRACT

The present invention relates to a device for regulating the flow rate and/or the pressure of a fluid transferred from a high-pressure reservoir (H) to a reservoir (S). A first valve (1) provided with a control (2) is mounted in a pipe (10, 11, 12) connecting the two reservoirs (H, S). A Laval nozzle (3) located downstream of the first valve (1) is provided with an electrical pressure-drop sensor (4). A second valve (5) provided with a control (6) is connected between the downstream part of the Laval nozzle and an exhaust orifice (R). A micro-programmed system (7), designed to receive the values read by the pressure-drop sensor (4) and to drive the two controls (2, 6) of the two valves (1, 5) makes it possible to regulate the flow rate and/or the pressure of the fluid transferred from the first reservoir (H) to the second reservoir (S).

5 Claims, 2 Drawing Sheets

DEVICE FOR REGULATING THE FLOW RATE AND/OR THE PRESSURE OF A FLUID

BACKGROUND OF THE INVENTION

The present invention relates to a device for regulating the flow rate and/or the pressure of a fluid transferred from a high-pressure reservoir to another reservoir.

In some applications, it is important to be able, on the one hand, to be aware of the flow rate of a fluid, in particular a gas supplied at high pressure and, on the other hand, to be able to adjust this flow rate and also the pressure depending on the application.

By way of nonlimiting example, if we take into consideration the case of blow-molding containers made of a polymer such as PET, it is important that it is possible, for example, in the preblowing phase, to control the flow of air, then, during the blow-molding phase, to be able to control the pressure to which the container is subjected and, finally, during expansion, to control the reduction in pressure.

In this particular application, the ability to control both the flow rate during preblowing and the pressure during blow-molding is a very important feature since poor management of these two parameters leads to disastrous results when manufacturing containers and a loss of raw material.

SUMMARY OF THE INVENTION

The aim of the present invention is to provide a device for regulating the flow rate and/or the pressure of a fluid transferred from a high-pressure reservoir to another reservoir.

The device according to the invention is characterized in that it comprises a first valve provided with a control mounted in a pipe connecting the two reservoirs, a Laval nozzle located downstream of the first valve and provided with an electrical pressure-drop sensor, a second valve provided with a control connected between the downstream part of the Laval nozzle and an exhaust orifice and finally a micro-programmed system designed to receive the values read by the pressure-drop sensor and to drive the two controls of the two valves so as to regulate the flow rate and/or the pressure of the fluid transferred from the first reservoir to the second reservoir.

The advantage of this simple solution is that of using the Laval nozzle which is a device well known in the field in order to be able, in spite of the high pressure, to obtain laminar conditions enabling the accurate measurement of a differential pressure at the boundaries of the nozzle in order to calculate therefrom the flow rate with accuracy and then to be able to feed it back to the valves in order to adjust the desired flow rate and the pressure.

According to a variant embodiment, the valves are solenoid seated valves which are controlled by an electromechanical device and more specifically, solenoids.

According to a variant embodiment, the fluid is a gas and the working pressure is between 1 and 100 bar.

The invention also relates to the use of this device in the exact case of blow-molding a polymer such as PET, which is used for managing three phases of blow-molding a hollow body made of a polymer:

preblowing during which the micro-programmed system regulates the flow of air towards the second reservoir through a working orifice by measuring the pressure drop at the terminals of the Laval nozzle and by acting on the control of the first solenoid valve, blow-molding during which the micro-programmed system regulates the air pressure at the working orifice connected to the second reservoir based on the reading of the pressure at the terminals of the Laval nozzle and by acting on the two controls of the solenoid valves, and finally expansion, during which the micro-programmed system gradually decreases the pressure between the working orifice and the exhaust orifice based on the reading of the pressure at the terminals of the Laval nozzle and by driving the electromechanical control of the second solenoid valve.

According to a use variant during preblowing, the flow of air is synchronized with the movement of the stretch rod on reading the signal of the position of said stretch rod.

BRIEF DESCRIPTION OF THE DRAWINGS

The invention will be described in more detail by means of the appended figures.

DESCRIPTION OF THE PREFERRED EMBODIMENTS

Figure 1:
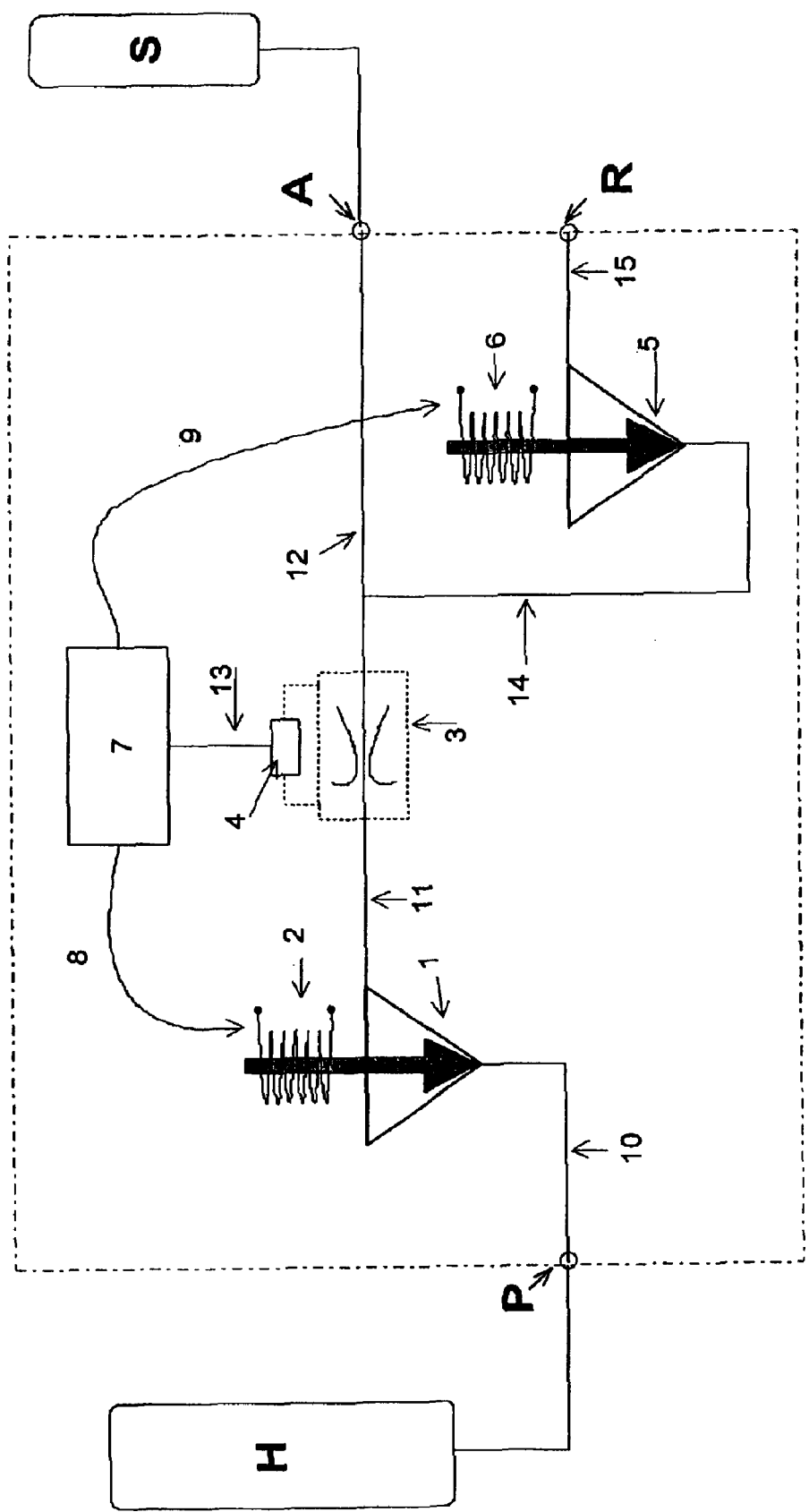
FIG. 1 shows schematically the main elements of a blow-molding plant according to the invention.

A high-pressure reservoir H communicates via a feed orifice P and a pipe 10, 11, 12 with a reservoir S through a working orifice A. The reservoir S is a hollow body inside of which a quantity of gas will be blown in order to form the desired container. A solenoid valve 1, with its control device 2, is inserted between the segments 10 and 11 of the pipe. A Laval nozzle 3 and a pressure-drop sensor 4 are mounted on the segment 11. Between the segments 11 and 12, a pipe 14 is connected to a second solenoid valve 5 and its control device 6, a pipe 15 connects the other terminal of the valve 5 to an exhaust orifice R. Finally, a micro-programmed system 7 receives the information read by the pressure-drop sensor and controls the electromechanical control elements 2 and 6 of the valves 1 and 5 via the lines 8 and 9. We have surrounded the device according to the invention, which physically corresponds to a body incorporating the elements described above, with a chain line.

We will now briefly describe the manufacture of the PET containers according to the three particular phases of their process, that is preblowing, blow-molding and expansion.

In the first, preblowing, phase, it is necessary to provide a flow of air from the feed orifice P to the working orifice A and this is achieved by reading the pressure drop by means of the device 4 at the terminals of the Laval nozzle 3. According to this reading, the micro-programmed system 7 controls the solenoid valve 1 so as to provide a flow of air according to a preestablished program. When the preblowing phase has ended, the blow-molding phase takes place during which it is important that the air pressure on the working orifice A connected to the reservoir S is regulated. This regulation is achieved by reading the pressure at the terminals of the Laval nozzle 3 and at the micro-programmed system 7 which, by controlling the two solenoid valves 1 and 5, regulates this pressure according to a preestablished program.

Finally, the expansion phase in which the pressure in the reservoir S must decrease gradually takes place in a similar way, that is depending on the reading of the pressure at the boundaries of the Laval nozzle, the micro-programmed system 7 controls the opening of the valve 5 which makes it possible to lower the pressure inside the reservoir S between the orifices A and R.

Figure 2:
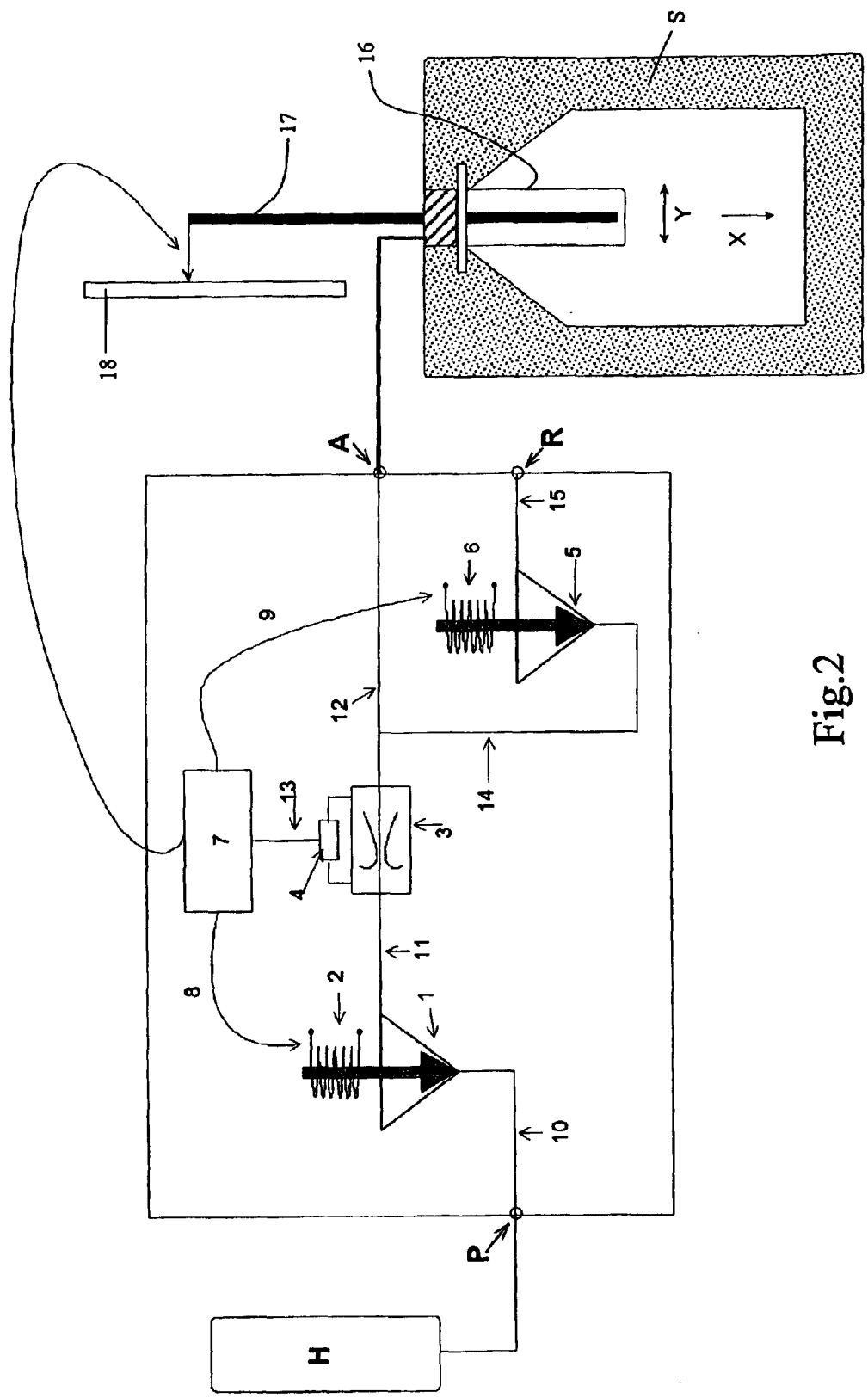
FIG. 2 shows the same plant with synchronization during preblowing of the flow of air with the position of the stretch rod.

With reference to FIG. 2, we have the same plant as described above but in addition we have introduced the possibility of synchronizing the flow of air during preblowing with the position of the rod 17 for stretching the preform 16. Specifically, it is known that, during the step of preblowing a polymer such as PET, the polymer preform 16 inserted into the hollow body S is stretched in the direction X by a stretch rod 17 while the blown gas provides the radial stretching of the preform. The present invention proposes to synchronize the flow of gas during preblowing by reading the pressure drop by means of the device 4 at the terminals of the Laval nozzle 3 and the signal of the position 18 of the stretch rod 16. These two readings allow perfect automated synchronization according to a preestablished program.

What is claimed is:

1. A device for regulating the flow rate and/or the pressure of a fluid transferred from a high-pressure reservoir (H) to a reservoir (S), which comprises a first valve (1) provided with a control (2) mounted in a pipe (10, 11, 12) connecting the two reservoirs (H, S), a Laval nozzle (3) located downstream of the first valve (1) and provided with an electric pressure-drop sensor (4), a second valve (5) provided with a control (6) connected between the downstream part of the Laval nozzle and an exhaust orifice (R) and finally a micro-programmed system (7) designed to receive the values read by the pressure-drop sensor (4) and to drive the two controls (2, 6) of the two valves (1, 5) so as to regulate the flow rate and/or the pressure of the fluid transferred from the first reservoir (H) to the second reservoir (S).

2. The device as claimed in claim 1, wherein said valves are solenoid seated valves and their control device (2, 6) is an electromechanical device.

3. The device as claimed in claim 1 or 2, wherein the fluid is a gas whose pressure is between 1 and 100 bar.

4. The use of the device as claimed in claim 3, which is used for managing three phases of blow-molding a hollow body made of a polymer such as PET:

preblowing during which the micro-programmed system regulates the flow of air towards the second reservoir (S) through a working orifice (A) by measuring the pressure drop at the terminals of the Laval nozzle (3) and by acting on the control of the first solenoid valve (1), blow-molding during which the micro-programmed system (7) regulates the air pressure at the working orifice (A) connected to the second reservoir (S) based on the reading of the pressure at the terminals of the Laval nozzle (3) and by acting on the two controls (2, 6) of the solenoid valves (1, 5), and expansion, during which the micro-programmed system gradually decreases the pressure between the working orifice (A) and the exhaust orifice (R) based on the reading of the pressure at the terminals of the Laval nozzle and by driving the electromechanical control (6) of the second solenoid valve (5).

5. The use as claimed in claim 4, wherein during the preblowing, the flow of air is synchronized with the movement of the stretch rod by reading the signal of the position of said stretch rod.

* * * * *